United States Patent
Shaylor et al.

(10) Patent No.: US 6,233,667 B1
(45) Date of Patent: May 15, 2001

(54) METHOD AND APPARATUS FOR A HIGH-PERFORMANCE EMBEDDED MEMORY MANAGEMENT UNIT

(75) Inventors: Nik Shaylor, Newark; Jeffrey M. W. Chan; Gary R. Oblock, both of Mountain View; Marc Tremblay, Menlo Park, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/263,704

(22) Filed: Mar. 5, 1999

(51) Int. Cl.$^7$ ....................................................... G06F 12/06
(52) U.S. Cl. ........................ 711/203; 711/200; 711/202; 711/206
(58) Field of Search ................................... 711/200, 118, 711/154, 206, 203, 220, 202

(56) References Cited

U.S. PATENT DOCUMENTS

| | | | |
|---|---|---|---|
| 3,803,559 | 4/1974 | Bandoo et al. | 340/172.5 |
| 4,837,738 | * 6/1989 | Lemay et al. | 711/200 |
| 4,926,322 | * 5/1990 | Stimac et al. | 395/500 |
| 5,420,993 | * 5/1995 | Smith et al. | 711/206 |
| 5,509,131 | * 4/1996 | Smith et al. | 711/206 |
| 5,555,395 | * 9/1996 | Parks | 711/145 |
| 5,687,342 | 11/1997 | Kass | 395/411 |
| 5,696,927 | * 12/1997 | MacDonald et al. | 711/207 |
| 5,854,913 | * 12/1998 | Goetz et al. | 712/210 |
| 5,901,246 | * 5/1999 | Hoffberg et al. | 382/209 |
| 6,081,750 | * 6/2000 | Hoffberg et al. | 700/17 |

FOREIGN PATENT DOCUMENTS 0 656 592 A1   11/1994   (EP) .
2 766 597      1/1999    (FR) .

* cited by examiner

Primary Examiner—Tuan V. Thai
(74) Attorney, Agent, or Firm—Park, Vaughan & Fleming LLP (57) ABSTRACT

The present invention provides a method and an apparatus for translating a virtual address to a physical address in a computer system. The system receives a virtual address during an execution or a fetch of a program instruction. The system determines if the virtual address is in an upper portion or a lower portion of a virtual address space. If the virtual address is in the lower portion of the virtual address space, the system adds the virtual address to a first base address to produce the physical address. The system also compares the virtual address against an upper bound. If the virtual address has a larger value than the upper bound, the system indicates an illegal access. If the virtual address is in the upper portion of the virtual address space, the system adds the virtual address to a second base address to produce the physical address. The system also compares the virtual address against a lower bound. If the virtual address has a lower value than the lower bound, the system indicates that the access is illegal. Thus, the system provides protection from illegal memory accesses. According to one aspect of the present invention, the system determines if the virtual address falls within portion of the virtual address space that is protected from write accesses. If so, the system disallows write accesses to the virtual address. Thus, the present invention dispenses with paging and reduces the virtual-to-physical address translation process to a simple addition operation. This leads to faster processor clock speeds, and can greatly reduce the cost of designing and fabricating a computer system.

18 Claims, 5 Drawing Sheets

METHOD AND APPARATUS FOR A HIGH-PERFORMANCE EMBEDDED MEMORY MANAGEMENT UNIT

BACKGROUND

1. Field of the Invention

The present invention relates to memory management units for converting virtual addresses to physical addresses in computer systems. More particularly, the present invention relates to a simple, efficient and fast method and apparatus for converting virtual addresses to physical addresses that provides protection from illegal memory accesses.

2. Related Art

Modem computer systems typically include hardware and operating system mechanisms to support memory management functions, such as virtual memory and paging. Over the years these systems have grown in complexity to include hardware structures such as memory management units (MMUs) and translation lookaside buffers (TLBs) as well as corresponding operating system mechanisms to support virtual memory and paging.

This memory management circuitry presently comprises a significant portion of the computational circuitry in a computer system. Consequently, the task of designing this memory management circuitry consumes a great deal of engineering resources, which increases the time and expense involved in developing a computer system. Furthermore, integrating this additional memory management circuitry onto a semiconductor chip increases the die size of the chip. This can lower yield during chip fabrication, which can greatly increase system cost. The additional circuitry also requires circuit signals to traverse larger distances, which can reduce processor clock speeds or result in increased latencies for memory accesses, and thereby reduce system performance. This results in increased latencies for memory accesses. Conventional memory management units also typically include circuitry to implement content addressable memories (CAMs) which consume a great deal of power.

Memory management functions also comprise a significant portion of the code in an operating system, which can greatly increase the complexity of the operating system. This correspondingly increases the amount of time and expense involved in developing the operating system.

Furthermore, the performance advantages of paging mechanisms are somewhat diminished for programs written in modem object-oriented programming languages. References to objects tend to be widely dispersed across a large number of pages. Consequently, such object-oriented programs tend to exhibit poor paging performance.

What is needed is a memory management mechanism that eliminates the complexity of conventional virtual memory paging systems.

SUMMARY

The present invention provides a method and an apparatus for translating a virtual address to a physical address in a computer system. The system receives a virtual address during an execution or a fetch of a program instruction. The system determines if the virtual address is in an upper portion or a lower portion of a virtual address space. If the virtual address is in the lower portion of the virtual address space, the system adds the virtual address to a first base address to produce the physical address. The system also compares the virtual address against an upper bound. If the virtual address has a larger value than the upper bound, the system indicates an illegal access. If the virtual address is in the upper portion of the virtual address space, the system adds the virtual address to a second base address to produce the physical address. The system also compares the virtual address against a lower bound. If the virtual address has a lower value than the lower bound, the system indicates that the access is illegal. Thus, the system provides protection from illegal memory accesses. According to one aspect of the present invention, the system determines if the virtual address falls within a portion of the virtual address space that is protected from write accesses. If so, the system disallows write accesses to the virtual address. Thus, the present invention dispenses with paging and reduces the virtual-to-physical address translation process to a simple addition operation. This leads to faster processor clock speeds, and can greatly reduce the cost of designing and fabricating a computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
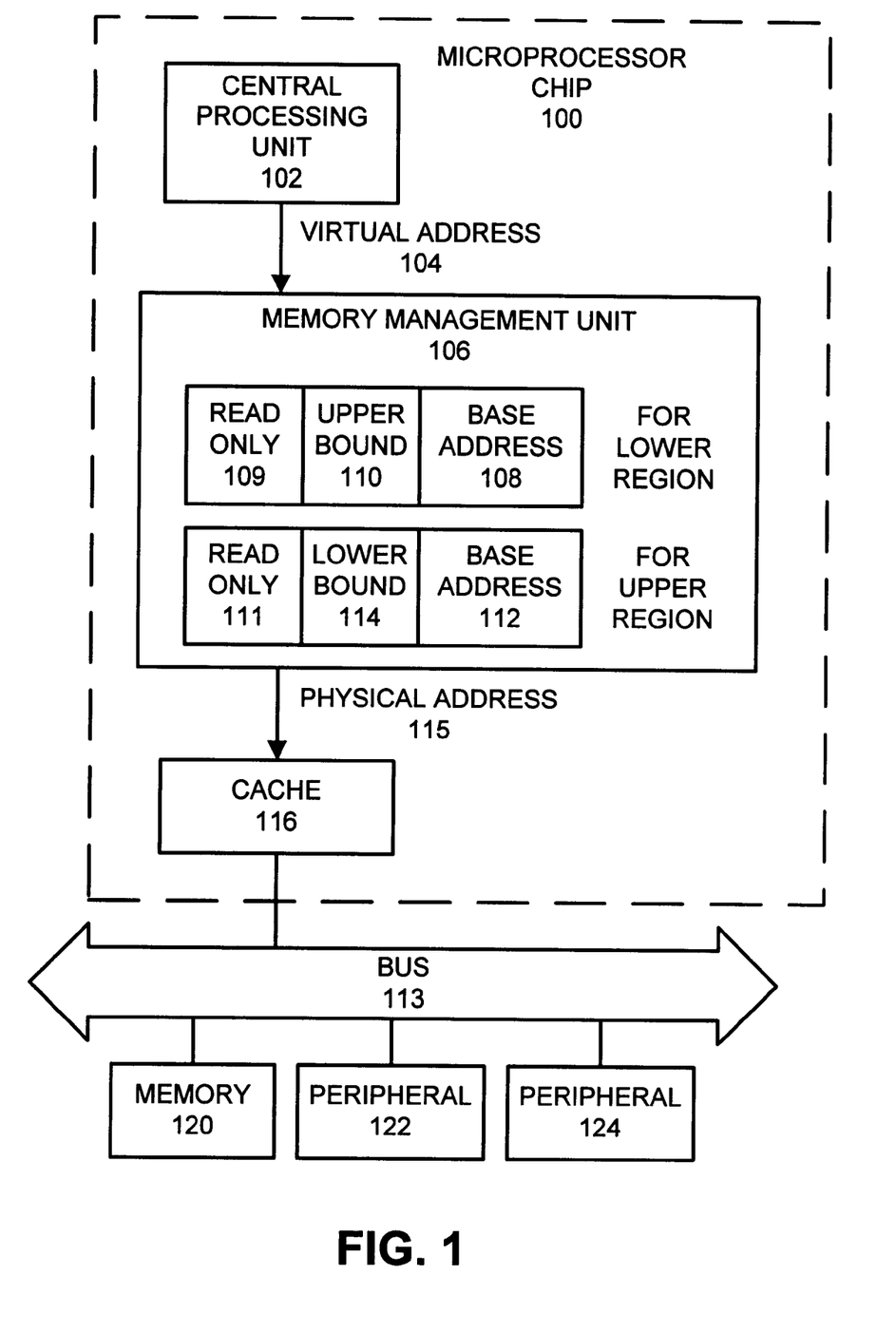
FIG. 1 illustrates a computer system in accordance with an embodiment of the present invention.

FIG. 1 illustrates a computer system in accordance with an embodiment of the present invention. This computer system includes central processing unit 102, memory management unit (MMU) 106, cache 116, bus 113, memory 120, peripheral device 122, and peripheral device 124. In general, central processing unit 102 may include any type of circuitry for performing computational operations. This includes, but is not limited to, central processing units for mainframe computers, personal computers, workstations, device controllers and smart appliances (such as a smart microwave oven).

Central processing unit 102 feeds virtual address 104 into MMU 106, which translates virtual address 104 into physical address 115. In the illustrated embodiment, MMU 106 contains six values. The values "read only" 109 (1 bit), upper bound 110 (15 bits) and base address 108 (16 bits) are associated with a lower region of a virtual address space 202. The values "read only" 111 (1 bit), lower bound 114 (15 bits) and base address 112 (16 bits) are associated with an upper region of the virtual address space 202. Note that the values read only 109, upper bound 110 and base address 108 fit within a first 32-bit register, and that the values read only 111, lower bound 114 and base address 112 fit within a second 32-bit register. Packing these values into two 32-bit registers facilitates rapid context switching. The above six values are described in more detail below with reference to FIG. 2.

Physical address 15 from MMU 106 feeds into cache 116, which stores copies of recently referenced memory items from memory 120. Cache 116 may be any type of cache memory, including separate instruction and data caches. The embodiment illustrated in FIG. 1 includes a unified instruction and data cache that is physically addressed. Note that high-performance computer systems can include a virtually-indexed physically-tagged cache in order to initiate cache accesses in parallel with MMU operations. However, in the illustrated embodiment, MMU 106 has a very simple design involving only a simple add operation, that introduces very little propagation delay. This allows the MMU operation to be performed before the cache lookup without significantly degrading system performance. Another embodiment of the present invention includes a virtually indexed cache memory that operates in parallel with MMU 106.

Cache 116 is coupled to memory 120 through bus 113. Bus 113 may be any type of communication channel for carrying data between memory 120 and microprocessor chip 100. Bus 113 additionally couples microprocessor chip 100 to peripheral devices 122 and 124. Peripheral devices 122 and 124 may be any type of peripheral device that can be attached a computer system, including, for example, a disk drive or a keyboard. In an alternative embodiment, peripheral devices 122 and 124 are coupled to CPU 102 through a peripheral bus, which is separate from a processor-to-memory bus. Memory 120 may be any type of random access memory for storing code and data for execution and manipulation by central processing unit 102.

Memory Mapping

Figure 2:
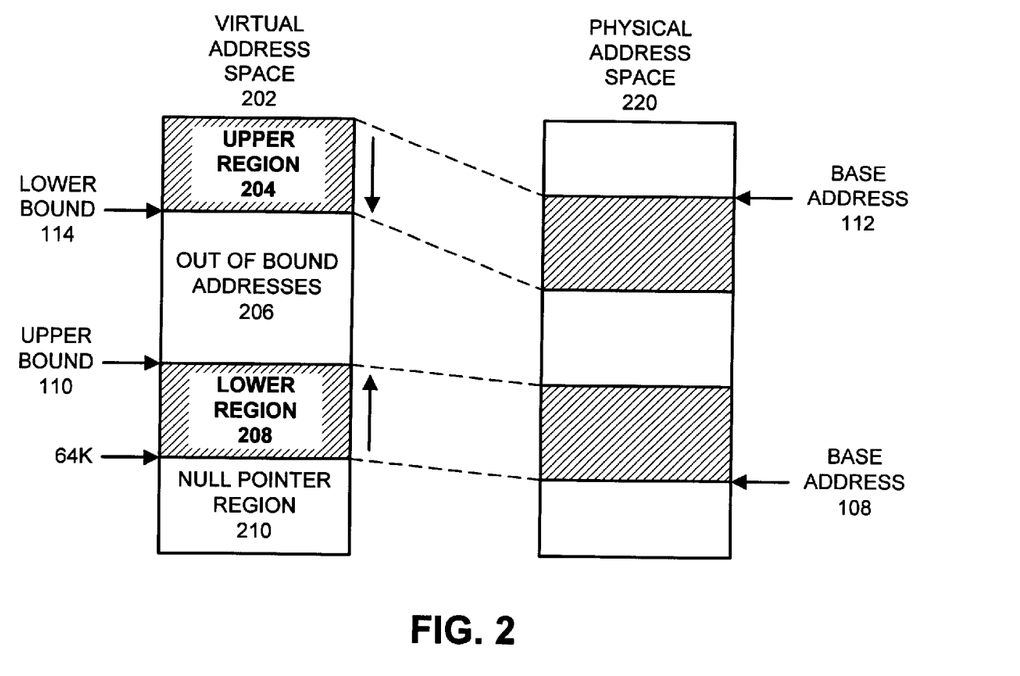
FIG. 2 illustrates how regions of a virtual address space are mapped into corresponding regions of a physical address space in accordance with an embodiment of the present invention.

FIG. 2 illustrates how regions of a virtual address space 202 are mapped into corresponding regions of a physical address space 220 in accordance with an embodiment of the present invention. In this embodiment, the MMU 106 (see FIG. 1) maps two regions of virtual address space 202 into corresponding regions in physical address space 220.

Lower region 208 starts near the bottom of the virtual address space 202 and extends upward. Lower region 208 is mapped into a corresponding region in physical address space 220, which extends upward from base address 108 in physical address space 220. The upper limit of lower region 208 is delimited by upper bound 110 in virtual address space 202.

Upper region 204 starts at the highest addressable location in virtual address space 202 and extends downward. Upper region 204 is mapped into a corresponding region in physical address space 220, which extends downward from base address 112 in physical address space 220. The lower limit of upper region 204 is delimited by lower bound 114 in virtual address space 202. Note that upper region 204 may actually be mapped into a lower area in physical memory than lower region 208.

In the system illustrated in FIG. 1, each region is associated with a "read only bit," which facilitates providing "read only" protection to the region. In the illustrated embodiment, read only bits 109 and 111 are associated with lower region 208 and upper region 204, respectively. If read only bit 109 is asserted, lower region 208 of virtual address space 202 cannot be modified. If read only bit 109 is not asserted, lower region 208 virtual address space 202 can be modified. If read only bit 111 is asserted, upper region 204 of virtual address space 202 cannot be modified. If read only bit 111 is not asserted, upper region 204 virtual address space 202 can be modified. These read only bits allow a system to support a simple dynamic linked library mechanism, which allows a library to be "read only" so that it can be shared safely by multiple programs.

One advantage of the embodiment illustrated in FIGS. 1 and 2 is that the granularity of translation can be coarse. As this coarseness increases, fewer bits of virtual address 104 require modification during the virtual address translation process. This can reduce the size, and hence increase the speed, of an adder that is used during the translation process. Furthermore, as coarseness increases, more lower-order bits of virtual address 104 can be immediately passed into cache 116, which improves cache performance.

Note that the above arrangement allows relocations to fall on 64K byte boundaries. The two base addresses 108 and 112 contain the upper 16 bits of starting physical addresses of the two regions; the corresponding upper and lower bounds 110 and 114 contain the respective lengths of these two regions.

In one embodiment of the present invention, an access outside of these two regions causes a hardware trap. During such a hardware trap, MMU 106 is automatically disabled, thereby allowing the trap handling "supervisor" code to reside in unmapped memory. If necessary, the supervisor code can extend the memory bounds.

Also note that lower region 208 does not extend all the way down to address zero. The first 64K bytes of virtual address space 202 is occupied by null pointer region 210. This provides a mechanism that checks for de-referencing a null pointer. This mechanism operates properly so long as no data structure is more than 64K bytes in length, which is a common restriction. If a data structure is larger that this, a large offset from a null pointer can map onto a valid address within lower region 208.

Address Translatine Circuitry

Figure 3:
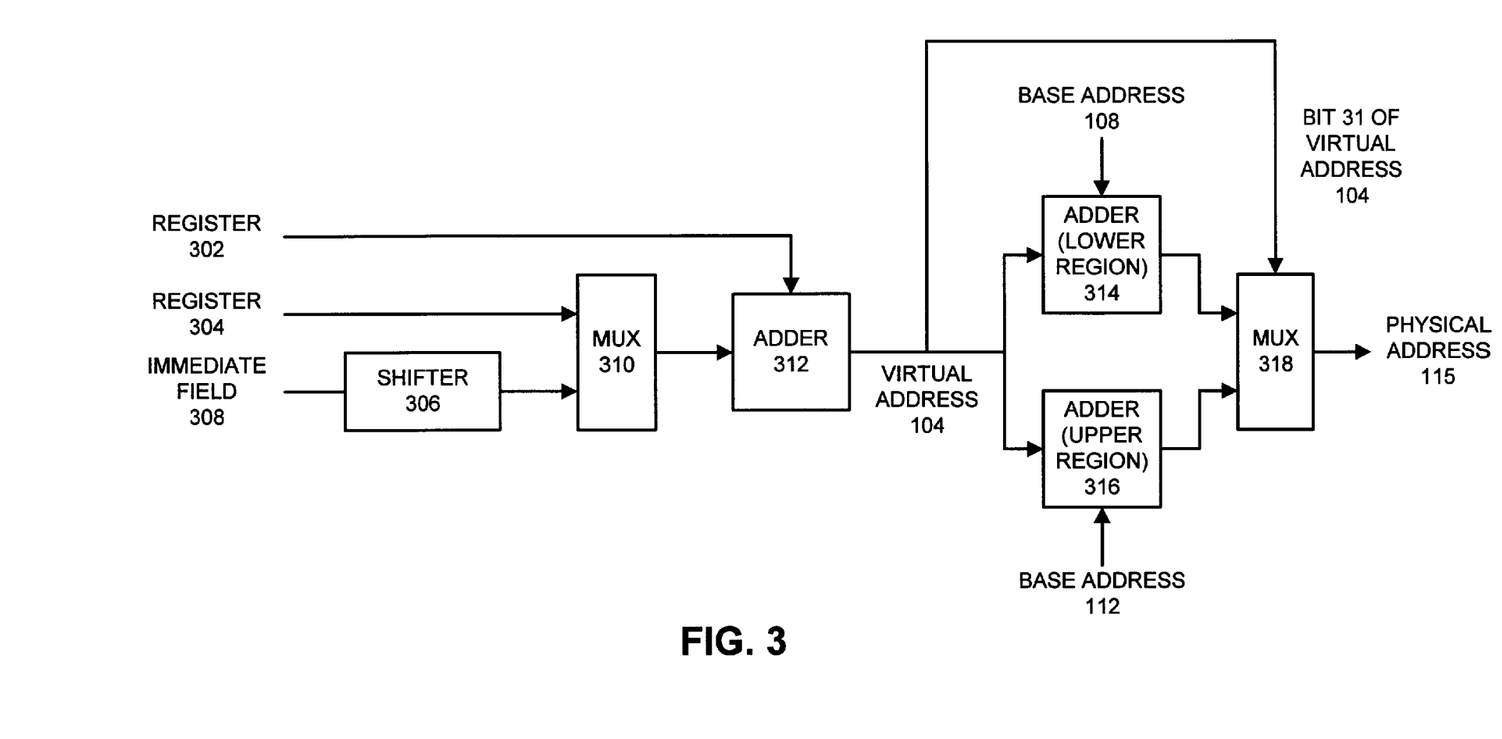
FIG. 3 illustrates some of the circuitry involved in translating a virtual address to a physical address in accordance with an embodiment of the present invention.

FIG. 3 illustrates some of the circuitry involved in translating a virtual address 104 into a physical address 115 in accordance with an embodiment of the present invention.

The circuitry on the left-hand side of FIG. 3 generates virtual address 104. This circuitry includes shifter 306, multiplexer (MUX) 310 and adder 312. Adder 312 adds the contents of register 302 with the contents of either register 304 or immediate field 308. This facilitates array indexing, by storing an array base address register 302 and an array index in either register 304 or immediate field 308.

Note that immediate field 308 facilitates using a numerical value from an instruction field as an array index. Immediate field 308 may be shifted in shifter 306, which is used to multiply the index by the array element size. This assumes, of course, that the array element size is a power of two. Common array element sizes will be, one byte (no shifting) for byte size array elements, two bytes (shift one bit) for half-word array elements, four bytes (shift two bits) for word-size array elements, or eight bytes (shift three bits) for double precision array elements.

Once virtual address 104 is constructed, it feeds into the right-hand side of the circuitry in FIG. 3. This circuitry performs the translation from virtual to physical addresses. Note that in this embodiment, the circuitry only operates on the higher order sixteen bits of virtual address 104 and physical address 115, because the lower order sixteen bits virtual address 104 and physical address 115 simply pass through the circuitry without translation.

The higher order 16 bits of virtual address 104 feed through adder 314, which adds the bits to base address 108 to produce a sum which feeds into an input of multiplexer (MUX) 318.

The higher order 16 bits of virtual address 104 additionally feed through adder 316, which adds the bits to base address 112 to produce a sum which feeds into the other input of MUX 318.

The highest order bit of virtual address 104 (bit 31) feeds into the select input of MUX 318. Bit 31 indicates whether virtual address 104 is in upper region 204 or lower region 208 of virtual address space 202. If it is in the upper region 204, the output of adder 316 becomes the output of MUX 318. Otherwise, the output of adder 314 becomes the output of MUX 318.

The output of MUX 318 becomes the upper 16 bits of physical address 115. Recall that the lower 16 bits of virtual address 104 simply pass through the circuit and become the lower 16 bits of physical address 115.

Circuitry for Detecting Illegal Accesses

Figure 4:
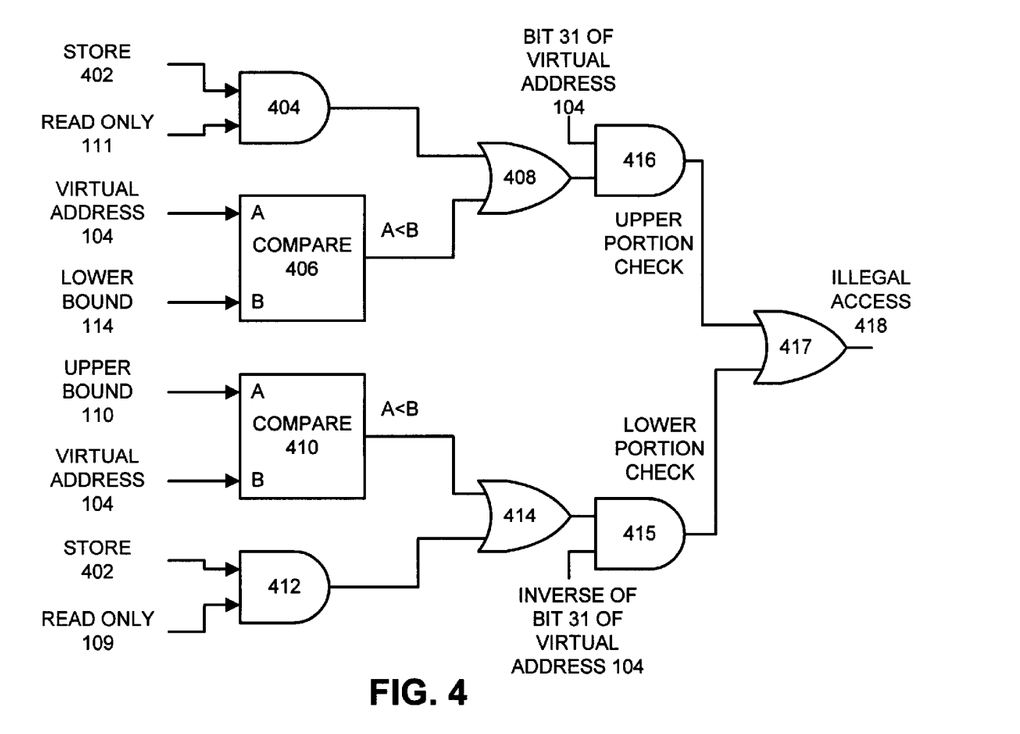
FIG. 4 illustrates some of the circuitry involved in detecting an illegal memory access in accordance with an embodiment of the present invention.

FIG. 4 illustrates some of the circuitry involved in detecting an illegal memory access in accordance with an embodiment of the present invention. This circuitry operates in parallel with the circuitry illustrated in FIG. 3. The circuit illustrated in FIG. 4 includes AND gates 404, 412, 416 and 415, as well as OR gates 408, 414 and 417. The circuit additionally includes compare units 406 and 410.

Compare units 406 and 410 determine whether virtual address 104 falls below lower bound 114 or exceeds upper bound 110, respectively. Compare unit 406 determines whether virtual address 104 is less than lower bound 114. Compare unit 410 determines whether upper bound 110 is less than virtual address 104.

AND gates 404 and 412 detect illegal write operations. AND gate 404 ands together store signal 402 with read only bit 111 from FIG. 1. The output of AND gate 404 is asserted if the operation is a write operation and read only bit 111 is set; this indicates an illegal access. AND gate 412 ands together store signal 402 with read only bit 109. The output of AND gate 412 is asserted if the operation is a write operation and read only bit 109 is set; this similarly indicates an illegal access.

The outputs of AND gates 404 and 412 and compare units 406 and 410 feed through AND gates 416 and 415, as well as OR gates 408, 414 and 417 to form illegal access signal 418. Illegal access signal 418 is asserted if virtual address 104 is in the upper portion of virtual address space 202 and either AND gate 404 or compare unit 406 is asserted. Illegal access signal 418 is also asserted if virtual address 104 is in the lower portion of virtual address space 202 and either AND gate 412 or compare unit 410 is asserted.

Note that bit 31 of virtual address 104 and the output of OR gate 408 pass through AND gate 416. This makes the upper half of the circuit in FIG. 4 active only if virtual address 104 is in the upper portion of virtual address space 202. Similarly, the inverse of bit 31 and the output of OR gate 414 pass through AND gate 415. This makes the lower half of the circuit in FIG. 4 active if virtual address 104 is in the lower portion of virtual address space 202.

Note that the circuitry for detecting null pointer region 210 is not shown. An access to null pointer region 210 can be detected by using another compare unit that compares virtual address 104 against the 64K upper boundary of null pointer region 210. If virtual address 104 falls below this upper boundary, an illegal access is indicated. An access to null pointer region 210 may alternatively be detected by examining the higher order bits past the first 16 bits of virtual address 104. If these bits are all zero values, virtual address 104 falls within null pointer region 210.

Also note that it is possible to perform bounds checking on physical addresses instead of virtual addresses; this results in precise memory exceptions as opposed to imprecise asynchronous memory exceptions.

Replicated Memory Management Units

Figure 5:
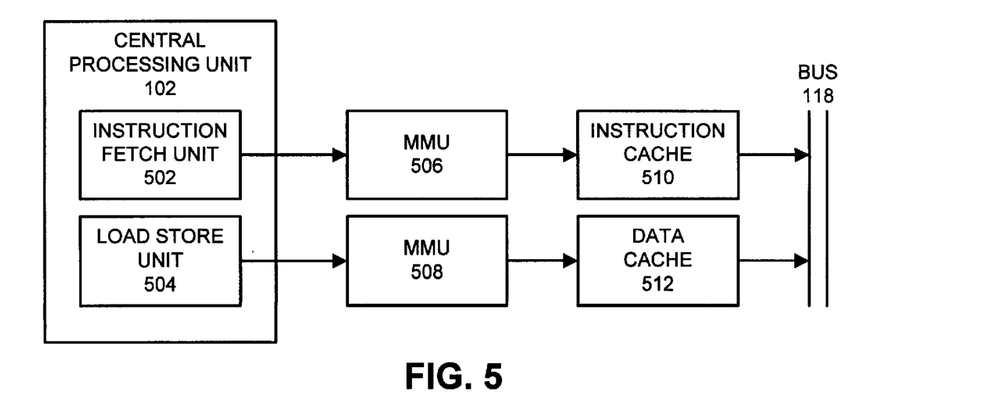
FIG. 5 illustrates a computer system with replicated memory management units for servicing instruction references and data references in accordance with an embodiment of the present invention.

FIG. 5 illustrates a computer system with replicated memory management units for servicing instruction references and data references in accordance with an embodiment of the present invention. In this embodiment, instruction fetch unit 502 within CPU 102 is coupled to instruction cache 510 through MMU 506. This pathway takes care of instruction references. For data references, load store unit 504 within CPU 102 is coupled to data cache 512 through MMU 508.

Note that MMU 508 is an exact replica of MMU 506, and that these MMUs are kept in consistent states. This means MMU 506 and MMU 508 contain the same values in read only bits 109 and 111, as well as in upper bound 110, lower bound 114, base address 108 and base address 112.

The simple MMU design of the present invention allows the MMUs to be replicated without taking up large amounts of semiconductor real estate. Also, note that providing multiple MMUs reduces address translation contention between instruction and data references.

Process of Address Translation

Figure 6:
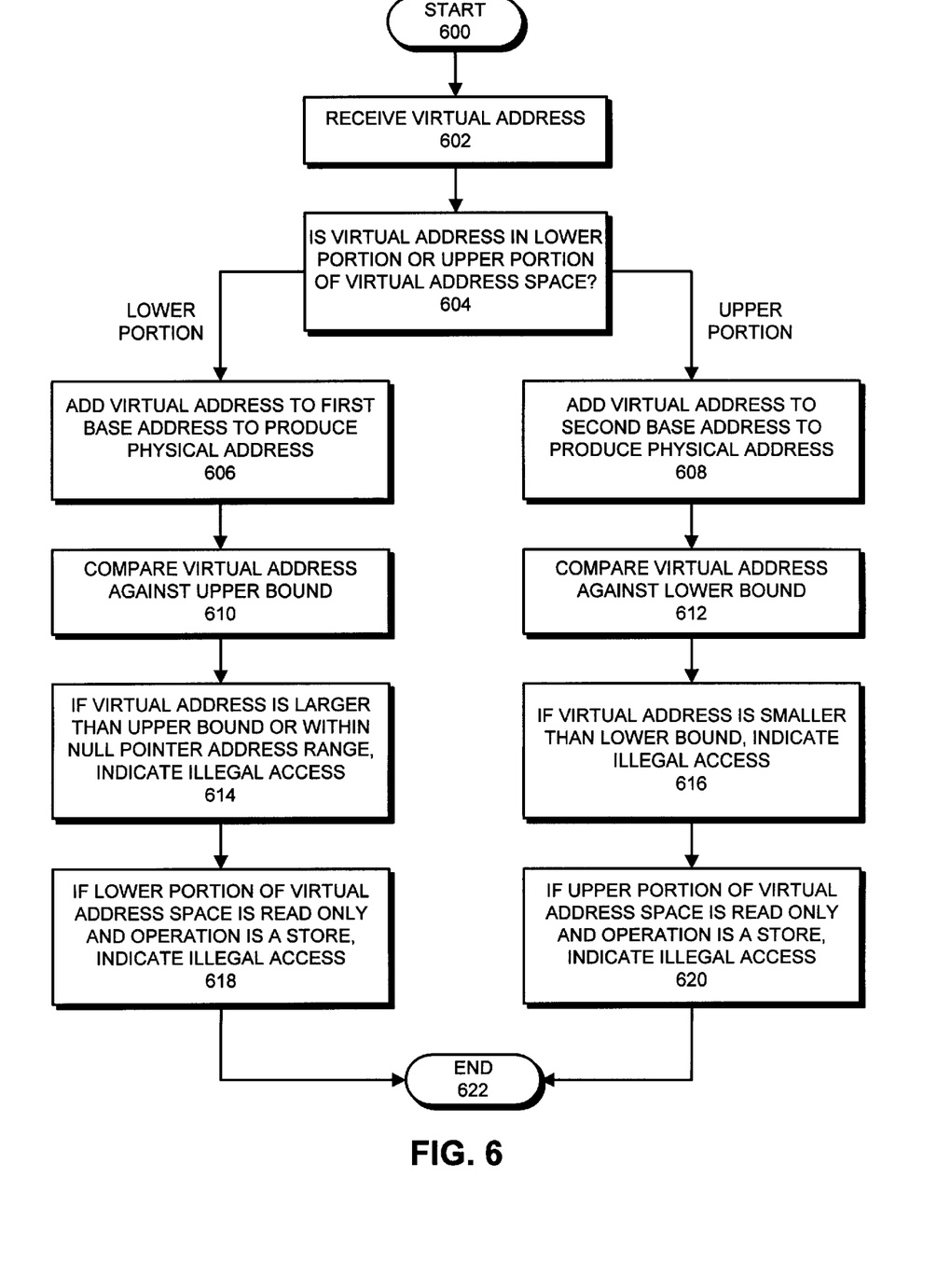
FIG. 6 is a flow chart illustrating the process of translating virtual addresses to physical addresses in accordance with an embodiment of the present invention.

FIG. 6 is a flow chart illustrating the process of translating virtual addresses to physical addresses in accordance with an embodiment of the present invention. The system starts by receiving virtual address 104 during an execution or a fetch of a program instruction (step 602). The system determines if virtual address 104 is an upper portion or a lower portion of virtual address space 202 (step 604). This can be determined by examining the most significant bit of virtual address 104. If the bit is asserted, virtual address 104 is in the upper portion. Otherwise, it is in the lower portion.

If virtual address 104 is in the lower region 208 of virtual address space 202, the system adds virtual address 104 to base address 108 to produce physical address 115 (step 606). The system also compares virtual address 104 against upper bound 110 (step 610). If virtual address 104 is larger than upper bound 110, the system asserts illegal access signal 418 (step 614). The system also examines read only bit 109. If lower region 208 of virtual address space 202 is "read only" and the access is a store operation, the system also asserts illegal access signal 418 (step 618).

If virtual address 104 is in the upper region 204 of virtual address space 202, the system adds virtual address 104 to base address 112 to produce physical address 115 (step 608). The system also compares virtual address 104 against lower bound 114 (step 612). If virtual address 104 is smaller than lower bound 114, the system asserts illegal access signal 418 (step 616). The system also examines read only bit 111. If upper region 204 of virtual address space 202 is "read only" and the access is a store operation, the system also asserts illegal access signal 418 (step 620).

Note that for both the upper region 204 and the lower region 208 the conversion operation is an addition. The conversion for upper region 204 may appear to involve a subtraction operation because upper region 204 starts at the top of virtual address space 202 and offsets proceed downward. However, a downward offset can be implemented with an adder using two's complement arithmetic.

In the embodiment illustrated in FIG. 5, the test for "read only" is redundant for MMU 506 because MMU 506 handles instructions, which are all "read only."

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for translating a virtual address into a physical address in a computer system, comprising:
    receiving the virtual address during an execution or a fetch of a program instruction;
    determining if the virtual address is in an upper portion or a lower portion of a virtual address space;
    if the virtual address is in the lower portion of the virtual address space,
        adding the virtual address to a first base address to produce the physical address, and
        comparing the virtual address against an upper bound, if the virtual address has a larger value than the upper bound, indicating that the access is illegal; and
    if the virtual address is in the upper portion of the virtual address space,
        adding the virtual address to a second base address to produce the physical address, and
        comparing the virtual address against a lower bound, if the virtual address has a lower value than the lower bound, indicating that the access is illegal,
    wherein the method is performed within a memory management unit that is integrated into a microprocessor chip.

2. The method of claim 1, further comprising:
    if the virtual address is in the lower portion of the virtual address space, determining if the lower portion of the virtual address space is protected from write accesses, and if so disallowing write accesses to the virtual address; and
    if the virtual address is in the upper portion of the virtual address space, determining if the upper portion of the virtual address space is protected from write accesses, and if so disallowing write accesses to the virtual address.

3. The method of claim 1, further comprising disabling address translations during operating system accesses to memory.

4. The method of claim 1, wherein the upper portion of the virtual address space contains read-only library routines.

5. The method of claim 1, wherein the program instruction may include an instruction that bypasses a cache in the computer system for direct memory access (DMA) operations.

6. The method of claim 1, further comprising determining if the access involves a null pointer by comparing the virtual address against a range of null pointer addresses, and if the virtual address falls within the range of null pointer addresses, indicating that the access is illegal.

7. An apparatus for translating a virtual address into a physical address in a computer system, comprising:
    an input that receives the virtual address during an execution or a fetch of a program instruction;
    an adder that creates a sum of the virtual address and a first base address if the virtual address is in a lower portion of a virtual address space, and that creates a sum of the virtual address and a second base address if the virtual address is in an upper portion of the virtual address space; and
    an access validating circuit that indicates an illegal access if the virtual address is in the lower portion of the virtual address space and the virtual address has a larger value than an upper bound, and that indicates an illegal access if the virtual address is in the upper portion of the virtual address space and the virtual address has a lower value than a lower bound;
    wherein the apparatus is integrated into a microprocessor chip.

8. The apparatus of claim 7, wherein the adder includes:
    a first adding circuit for adding the virtual address to the first base address;
    a second adding circuit for adding the virtual address to the second base address, and
    a selector circuit that selects between an output of the first adding circuit and an output of the second adding circuit.

9. The apparatus of claim 7, wherein the access validating circuit is configured to determine if the lower portion of the virtual address space is protected from write accesses, and if so to disallow write accesses to the lower portion of the virtual address space, and is configured to determine if the upper portion of the virtual address space is protected from write accesses, and if so to disallow write accesses to the upper portion of the virtual address space.

10. The apparatus of claim 7, further comprising a mechanism that disables address translations during operating system accesses to memory.

11. The apparatus of claim 7, wherein the upper portion of the virtual address space contains read-only library routines.

12. The apparatus of claim 7, further comprising a mechanism that bypasses a cache in the computer system for direct memory access (DMA) operations.

13. The apparatus of claim 7, wherein the access validating circuit is configured to determine if the access involves a null pointer by comparing the virtual address against a range of null pointer addresses, and if the virtual address falls within the range of null pointer addresses, indicating that the access is illegal.

14. An apparatus for translating a virtual address into a physical address in a computer system, comprising:
    an input that receives the virtual address during an execution or a fetch of a program instruction;
    an adder that creates a sum of the virtual address and a first base address if the virtual address is in a lower portion of a virtual address space, and that creates a sum of the virtual address and a second base address if the virtual address is in an upper portion of the virtual address space, wherein the adder includes, a first adding circuit for adding the virtual address to the first base address, a second adding circuit for adding the virtual address to the second base address, and a selector circuit that selects between an output of the first adding circuit and an output of the second adding circuit; and an access validating circuit that indicates an illegal access if the virtual address is in the lower portion of the virtual address space and the virtual address has a larger value than an upper bound, and that indicates an illegal access if the virtual address is in the upper portion of the virtual address space and the virtual address has a lower value than a lower bound;

wherein the access validating circuit is configured to determine if the lower portion of the virtual address space is protected from write accesses, and if so to disallow write accesses to the lower portion of the virtual address space, and is configured to determine if the upper portion of the virtual address space is protected from write accesses, and if so to disallow write accesses to the upper portion of the virtual address space, and wherein the apparatus is integrated into a microprocessor chip.

15. The apparatus of claim 14, wherein the access validating circuit is configured to determine if the access involves a null pointer by comparing the virtual address against a range of null pointer addresses, and if the virtual address falls within the range of null pointer addresses, indicating that the access is illegal.

16. A computer system, comprising:

a central processing unit;

a main memory; and a first memory management unit within a semiconductor device that contains the central processing unit for translating a virtual address into a physical address, coupled between the central processing unit and the main memory, the first memory management unit comprising, an adder that creates a sum of the virtual address and a first base address if the virtual address is in a lower portion of a virtual address space, and that creates a sum of the virtual address and a second base address if the virtual address is in an upper portion of the virtual address space, and an access validating circuit that indicates an illegal access if the virtual address is in the lower portion of the virtual address space and the virtual address has a larger value than an upper bound, and that indicates an illegal access if the virtual address is in the upper portion of the virtual address space and the virtual address has a lower value than a lower bound.

17. The computer system of claim 16, further comprising a cache memory coupled between the central processing unit and the main memory, wherein the first memory management unit is coupled between the central processing unit and the cache memory.

18. The computer system of claim 16, further comprising:

an instruction cache coupled between the central processing unit and the main memory;

a data cache coupled between the central processing unit and the main memory; and a second memory management unit within the semiconductor device that contains the central processing unit which is configured identically with the first memory management unit;

wherein the first memory management unit is coupled between the central processing unit and the instruction cache, and the second memory management unit is coupled between the central processing unit and the data cache, whereby the first memory management unit performs translations for instruction accesses and the second memory management unit performs translations for data accesses.

* * * * *